United States Patent Office 3,169,879
Patented Feb. 16, 1965

3,169,879
PLASTICIZED PLASTIC COMPOSITIONS
Ottmar Wahl, Baden-Baden, and Herbert Grabhofer, Cologne-Flittard, Germany, assignors to Agfa Aktiengesellschaft, Leverkusen, Germany, a corporation of Germany
No Drawing. Filed Nov. 15, 1960, Ser. No. 69,288
Claims priority, application Germany, Nov. 17, 1959,
A 33,315
9 Claims. (Cl. 106—176)

The invention relates to a process for the production of plastic compositions, using plasticizing agents.

Numerous compounds are known which are suitable as plasticizing agents for synthetic resins of which phosphoric acid esters in particular have become of industrial importance. Furthermore, cyanethyl ethers of glycol and glycerine have also been used as plasticizers for cellulose acetate. However, the range of their application is very limited since they still have a marked volatility and a certain solubility in water.

It has now been found that these disadvantages are avoided by using cyanethyl ethers of pentaerythritol as plasticizing agent. As compared with the known plasticizers, these compounds are distinguished by their far lower volatility and by their insolubility in water. As a result, the highly polymeric substances to which the cyanethyl ethers of pentaerythritol are added are more resistant to the effect of heat and moisture. Especially suitable are those derivatives of pentaerythritol in which at least two of the hydroxyl groups are converted into cyanethyl ether radicals. The two remaining hydroxyl groups can likewise be converted into cyanethyl ether radicals or they can on the other hand be etherified or esterified. Compounds which correspond to the Formulae I and II are especially suitable and can be prepared in a particularly simple manner.

(I)
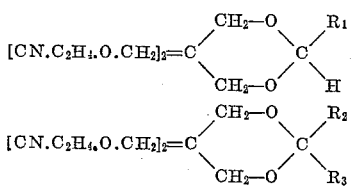

(II)
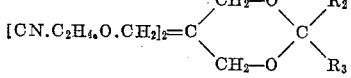

In these Formulae, $R_1$, $R_2$ and $R_3$ represent hydrocarbon radicals of an aliphatic, aromatic or heterocyclic nature, for example alkyl, aryl, aralkyl, furyl, in which the hydrogen atoms are in turn replaced by amino groups, halogens, nitro groups or nitrile groups.

The compound of the formula $$C(CH_2OCH_2—CH_2—CN)_4$$

has particularly good properties.

These compounds can be prepared in various ways. If acrylonitrile is reacted with pentaerythritol in aqueous or organic solvents and in the presence of agents with an alkaline reaction the tetracyanethyl ether of pentaerythritol is obtained when at least 4 molecules of acrylonitrile enter into reaction with one molecule of pentaerythritol. If only two molecules of acrylonitrile enter into reaction then the dicyanethyl ether of pentaerythritol is obtained, which can then be further reacted with aldehydes or ketones to produce the cyclic ketals or acetals of Formulae I and II.

On the other hand, by reacting pentaerythritol with aldehydes or ketones, it is also possible to prepare the acetals or ketals of Formulae III and IV, respectively, and then the two residual hydroxyl groups can be converted by reaction with acrylonitrile into the cyanethyl ethers of Formulae I and II.

(III)
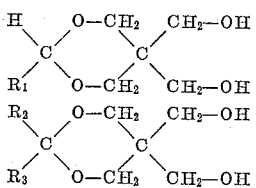

(IV)
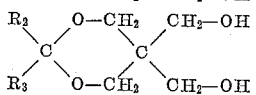

The preparation of a number of such plasticizers is described in the following examples.

The compounds are distinguished by their good compatibility with many compounds of high molecular weight.

Owing to their very high vaporizing temperature and their excellent heat resistance, they are especially suitable as plasticizers for thermoplastic high polymers, into which they can be introduced without using solvents, simply by mixing at the processing temperature of the thermoplasts.

On account of their excellent solubility in numerous organic solvents, they can be used very satisfactorily in the production of films, foils, lacquers and protective coatings and also other shaped plastic compositions which are cast or applied from organic solutions of organic compounds of high molecular weight such as cellulose esters, cellulose ethers, polyvinyl compounds, for example, polyvinyl chloride, polyvinyl acetate, polystyrene, polycarbonates of 2,2-bis(4-hydroxyphenyl)propane(bisphenol A polycarbonates), chlorinated rubber, alkyd resins, polyesters, polymers of acrylic acid and derivatives thereof, polyethylene, polypropylene and other polymers and copolymers.

EXAMPLE 1

Preparation of 2-trichloromethyl-5,5-di(cyanethoxymethyl)-m-dioxane

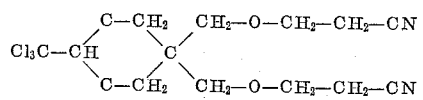

52.4 g. (0.2 mol) of monochloral pentaerythritol (British patent specification 629,691) and 2 g. of sodium methylate are dissolved in 250 cc. of anhydrous dioxane and 26.5 (0.5 mol) of acrylonitrile are added dropwise, the temperature of the reaction mixture being kept at 30° C. by cooling with water. After all the acrylonitrile has been added, the mixture is heated for 2 hours to 60° C. The mixture is thereafter cooled and the product of the reaction is precipitated by pouring into 1 liter of iced water. After recrystallization from methanol, white crystals are obtained with the melting point of 80° C. Yield: 54 g. (73 percent of the theoretical).

Analysis.—Calculated: C, 42; H, 4.6; N, 7.6; Cl, 28.4 percent. Found: C, 41.9; H, 4.6; N, 7.6; Cl, 28.5 percent.

PRODUCTION OF THE FILM 5 to 20 g. of the aforementioned plasticizer are added to a solution of 50 g. of cellulose acetate and 6 g. of isopropanol in 350 g. of methylene chloride. This casting solution is heated for 5 minutes to 90° C. and then cooled in a closed vessel. The deaerated solution is poured on to a glass plate so that a dry film with a thickness of about 80μ is formed. The film is stripped from the support after about 30 minutes and dried in a drying chamber for 2 hours at a temperature of 80° C.

EXAMPLE 2

*Preparation of 2-phenyl-5,5-di-(cyanethoxymethyl)-m-dioxane*

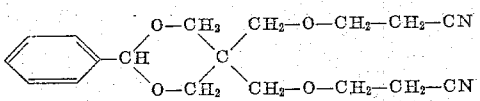

159 g. (3 mols) of acrylonitrile are slowly incorporated by stirring into a suspension of 224 g. (1 mol) of monobenzal pentaerythritol (Organ. Synth. 38, edition 1958, page 65), 5 g. of sodium hydroxide and 750 g. of water at 25° C. After completing the addition of the acrylonitrile the mixture is heated for 5 hours to 50° C. The reaction product then separates out as an oil. It is neutralized with dilute hydrochloric acid, separated from the aqueous phase and freed from volatile constituents by heating in vacuo. Yield: 235 g. (71 percent of the theoretical).

*Analysis.*—Calculated: N, 8.48 percent. Found: N, 8.50 percent.

PRODUCTION OF THE FILM 5 to 20 g. of the mixture of the aforementioned plasticizer and tricresole phosphate in proportion by weight of 1:2 are added to a solution of 50 g. of cellulose acetate and 6 g. of isopropanol in 350 g. of methylene chloride. This casting solution is heated for 5 minutes to 90° C. and then cooled in a closed vessel. The deaerated solution is poured on to a glass plate so that a dry film with a thickness of about 80µ is formed. The film is stripped from the support after about 30 minutes and dried in a drying chamber for 2 hours at a temperature of 80° C.

EXAMPLE 3

*Preparation of 2-methyl-2-carbethoxymethyl-5,5-di-(cyanethoxy-methyl)-m-dioxane*

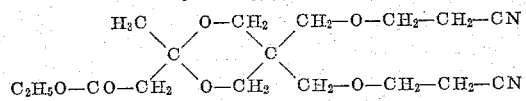

24.8 g. (0.1 mol) of monoacetoacetic acid ethyl ester pentaerythritol (Ber. 64B, page 787 (1928)) and 1 g. of sodium methylate are dissolved in 200 cc. of anhydrous dioxane and reacted at 25° C. with 15.9 g. (0.3 mol) of acrylonitrile. After 5 hours, the reaction mixture is poured into 500 cc. of iced water, neutralized with dilute hydrochloric acid and separated from the aqueous phase. The oil which is obtained is heated in vacuo to 200° C. for removing all volatile constituents. Yield: 28 g. (79 percent of the theoretical).

The substance is used as in Example 1.

EXAMPLE 4

*Preparation of 2-(4-dimethylaminophenyl)-5,5-di-(cyanethoxy)-methyl-m-dioxane*

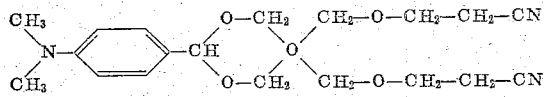

26.7 g. (0.1 mol) of p-dimethylaminobenzal pentaerythritol (Journal Chem. Soc. [London], 1926, page 3240) and 1 g. of sodium methylate are dissolved in 200 ml. of anhydrous dioxane and 15.9 g. (0.3 mol) of acrylonitrile are added in portion at room temperature. After a reaction period of 5 hours, about 150 ml. of dioxane are distilled off in vacuo and the residue is taken up in 200 ml. of ether. The ethereal solution is extracted by shaking three times with water, using 200 ml. thereof on each occasion, dried with anhydrous $Na_2SO_4$ and concentrated by evaporation. In order to remove the residual volatile constituents, the oil which is obtained is heated in vacuo to 150° C. Yield: 29 g. (78 percent of the theoretical).

The substance is used as in Example 1.

EXAMPLE 5

*Preparation of pentaerythritol tetracyanethyl ether*

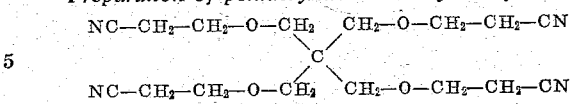

272 g. (2 mols) of pentaerythritol and 10 g. of sodium hydroxide are suspended in 300 ml. of water and reacted with 466 g. (8.8 mols) of stabilized acrylonitrile at 45° C. After completing the addition of the acrylonitrile, the mixture is stirred for 5 hours at room temperature. Thereafter, the aqueous phase is separated out, the oily product is neutralized with dilute hydrochloric acid and it is extracted by twice shaking with successive 300 ml. portions of water. After drying in a vacuum drying chamber, a crystalline product is obtained which has the melting point 28–30° C. Yield: 645.5 g. (93 percent of the theoretical).

*Analysis.*—Calculated: C, 58.6; H, 6.9; N, 16.1 percent. Found: C, 58.5; H, 7.0; N, 15.9 percent.

The substance is used as in Example 1.

EXAMPLE 6

30 parts by weight of the plasticizer of Example 1 are worked into 70 parts of polyvinyl chloride by means of mixing rollers heated to 160° C. The homogeneous mixture is stripped off and used for the production of moulded articles.

EXAMPLE 7

A solution of 40 g. of polycarbonate of 2,2-bis(4-hydroxyphenyl)propane(bisphenol A) in 300 g. of methylene chloride are mixed with 10 g. of the plasticizer of Example 5 dissolved in 50 g. of methylene chloride. The casting solution is freed from air bubbles by heating and is then cooled and cast on to the support and stripped off after drying. A crystal clear polycarbonate film is formed.

EXAMPLE 8

10 g. of the plasticizer of Example 2 are added to a solution of 50 g. of polystyrene in 350 g. of methylene chloride. This casting solution is heated for some minutes to 90° C. and then cooled. The deaerated solution is poured on to a glass plate so that a dry film is formed. The film is stripped off after about 30 minutes and dried in a drying chamber for 2 hours at a temperature of 80° C.

It will be clear to those skilled in this art that the practice of the invention lends itself readily to a number of useful modifications in method, apparatus, materials etc. For example, the synthetics used are not limited to the previously mentioned because it may comprise any suitable compositions of thermoplastic resins. The invention is not to be considered as limited to the specific methods of applying the plasticizers as described in the invention. Furthermore, the plasticizer may be used in combination with other plasticizers according to the invention or with plasticizers known per se such as esters of phosphoric acid, phthalic acid, adipic acid or sebacic acid.

What we claim is:

1. A plastic composition consisting essentially of a substance of the group consisting of cellulose esters, polyvinyl chloride, polycarbonates of bis(hydroxyphenyl) alkanes, and polystyrenes, which contains an amount that is sufficient to plasticize the said substance of a compound having the formula:

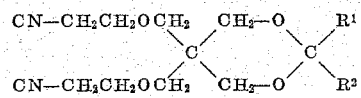

in which
  $R^1$ is a radical of the group consisting of hydrogen and lower alkyl, and $R^2$ is a radical of the group consisting of lower alkyl, halogen-substituted lower alkyl, carboxy-substituted lower alkyl, lower alkoxycarbonyl-substituted lower alkyl, phenyl and amino-substituted phenyl radicals.

2. A plastic composition as defined in claim 1 in which the substance that is plasticized is cellulose acetate.

3. A plastic composition as defined in claim 1 in which the substance that is plasticized is polyvinyl chloride.

4. A plastic composition as defined in claim 1 in which the substance that is plasticized is a polycarbonate of bisphenol A.

5. A plastic composition as defined in claim 1 in which the substance that is plasticized is polystyrene.

6. A plastic composition as defined in claim 1 in which the plasticizing compound has the formula

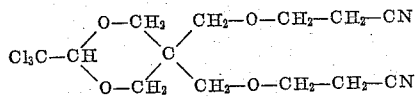

7. A plastic composition as defined in claim 1 in which the plasticizing compound has the formula

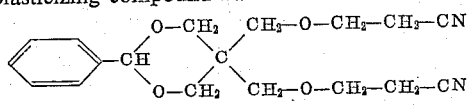

8. A plastic composition as defined in claim 1 in which the plasticizing compound has the formula

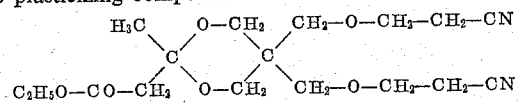

9. A plastic composition as defined in claim 1 in which the plasticizing compound has the formula

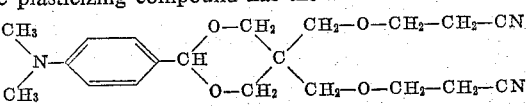

References Cited in the file of this patent

UNITED STATES PATENTS

| | | |
|---|---|---|
| 1,703,697 | Trickey | Feb. 26, 1929 |
| 1,735,157 | Carroll | Nov. 12, 1929 |
| 1,770,153 | Davidson | July 8, 1930 |
| 2,401,607 | Bruson | June 4, 1946 |
| 2,437,905 | Bruson | Mar. 16, 1948 |
| 2,606,907 | Blicke | Aug. 12, 1952 |
| 2,609,304 | Jones et al. | Sept. 2, 1952 |
| 2,956,975 | Greenspan | Oct. 18, 1960 |
| 2,980,698 | Heckert et al. | Apr. 18, 1961 |
| 2,996,517 | Leech et al. | Aug. 15, 1961 |

UNITED STATES PATENT OFFICE
CERTIFICATE OF CORRECTION

Patent No. 3,169,879                           February 16, 1965

Ottmar Wahl et al.

It is hereby certified that error appears in the above numbered patent requiring correction and that the said Letters Patent should read as corrected below.

Column 2, lines 41 to 45, the formula should appear as shown below instead of as in the patent:

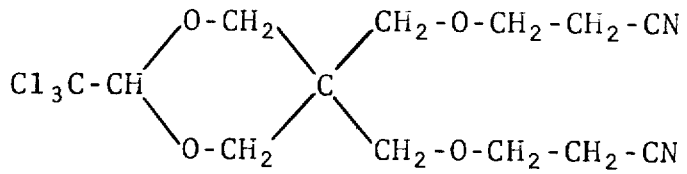

Signed and sealed this 17th day of August 1965.

(SEAL)
Attest:

ERNEST W. SWIDER                                       EDWARD J. BRENNER
Attesting Officer                                             Commissioner of Patents